Dec. 17, 1963  R. D. OPPENHEIM ET AL  3,114,650
TIRE COATED WITH REMOVABLE COATING COMPRISING MODIFIED
POLYVINYL ALCOHOL AND METHOD OF COATING
Filed June 10, 1960
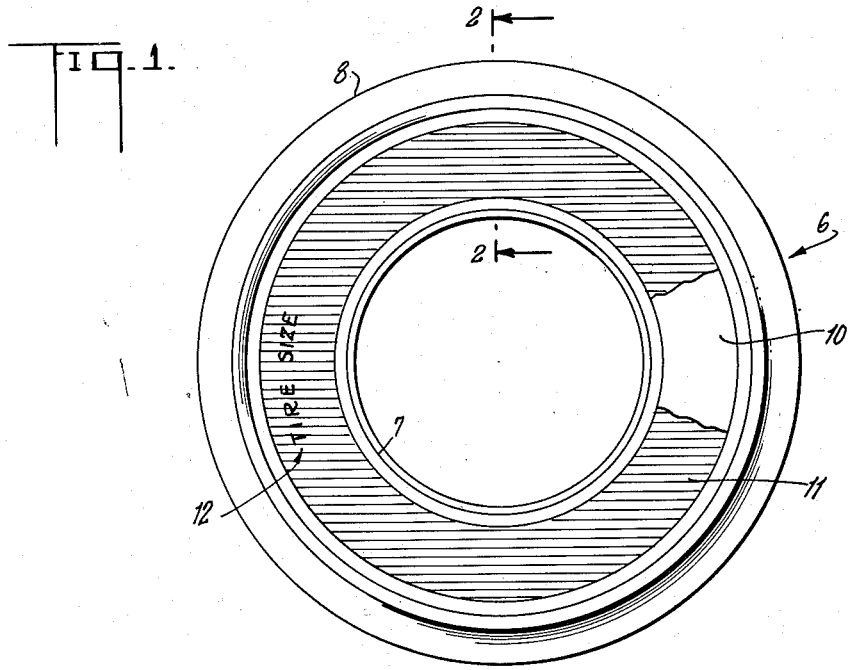
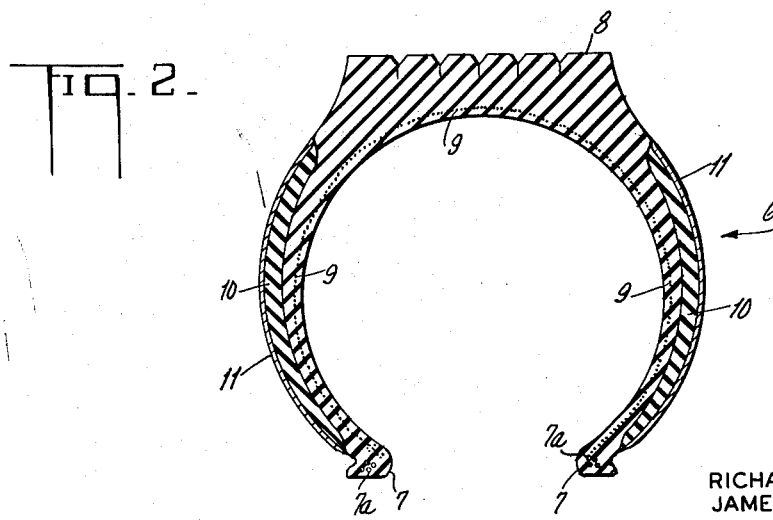
INVENTORS
RICHARD D. OPPENHEIM
JAMES E. BORNER
BY
ATTORNEYS

United States Patent Office 3,114,650
Patented Dec. 17, 1963

3,114,650
TIRE COATED WITH REMOVABLE COATING COMPRISING MODIFIED POLYVINYL ALCOHOL AND METHOD OF COATING
Richard D. Oppenheim, Roslyn Heights, and James E. Borner, Glen Cove, N.Y., assignors to Spraylat Corporation, New York, N.Y., a corporation of New York
Filed June 10, 1960, Ser. No. 35,206
13 Claims. (Cl. 117—6)

This invention relates to protective coverings which are intended to serve as such merely temporarily. More particularly, it relates to protective coverings of the type referred to which are based on condensation products of polyvinyl alcohol and lower alkylene oxide.

The invention was occasioned by the need for an improved temporary protective covering for automobile tires, particularly the sidewalls of white sidewall tires.

In the marketing of white sidewall tires or cars equipped with white sidewall tires, it is important that the tires have a clean appearance and be free of surface blemishes which would detract from the appearance of the tires. To this end, it has been the practice to provide a protective cover to serve during the interval between manufacture and installation. Heretofore, such covers have been provided by applying to the tire a water-soluble soap composition and then wrapping the tire with paper. This manner of protection has several disadvantages. The wrapping of the tire is costly due to the cost of the paper and the cost of the machinery used for doing the wrapping. Further, the presence of the paper makes identification of the tire difficult. Moreover, the paper wrapping is susceptible to damage and this in turn makes damage to the tire likely. Then, too, injury is likely to be inflicted at the time the paper is removed as workmen frequently tear the paper from the tire in a manner that mars the sidewalls.

A principal object of the invention is to provide a protective covering for tires, or the white sidewalls of tires, which covering is free of the above-mentioned disadvantages of the soap film-paper wrapping covering.

Another object of the invention is to provide a protective covering for tires, or white sidewalls, which covering has high tensil strength, elasticity, and elongation, and other suitable physical properties so as to withstand the bending, flexing, rubbing and loads to which the tires are subjected during handling, shipment and storage. Failure of the covering, even if only a crack, is likely to result in a surface blemish since failure exposes a portion of the tire to ozone attack and such attack is usually accompanied by a marring or cracking of the tire surface. Accordingly, physical properties suitable in the respects mentioned are much to be desired.

Still another objective is to provide a protective covering which is impervious to ozone.

Still another object of the invention is to provide a protective covering for tires or white sidewalls which covering will withstand, without significant changes in properties, including elasticity and flexibility, varying humidity, temperature and atmospheric pollution such as the tire is likely to be exposed to. Further, the protective coating is to have good aging properties so that the physical properties of the film do not change significantly during use. Similarly, it is an object of the invention that the covering be resistant to organic liquids such as gasoline, oil and greases and organic solvents such as are likely to come into contact with the tire.

Still other objects of the invention are to provide a covering which can be applied to the tire in a convenient manner and can also be conveniently removed from the tire.

Other objects of the invention will be apparent from the ensuing description.

According to the invention, a water-soluble resin is employed to form the protective covering. It can be applied to the tire surface as an aqueous solution, and then dried by heating to evaporate the water and deposit the resin on the surface. Removal of the protective covering can be effected by washing with water.

The resin is of the group known as internally plasticized polyvinyl alcohol and is the condensation product of polyvinyl alcohol and an organic monoepoxy compound. The organic monoepoxy compound can be a monoepoxy hydrocarbon such as an alkylene oxide or styrene oxide or a like oxide of the vinyl group. The preferred monoepoxy compounds are lower alkylene oxides such as an alkylene oxide of the formula

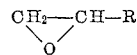

wherein R is hydrogen, or a lower alkyl group. Preferably R has 1 or 2 carbon atoms, and can be for example ethylene oxide, propylene oxide, (1,2-epoxypropane) or 1,2-butylene oxide, or 2,3-butylene oxide. Ethylene oxide is preferred.

The alkoxylation can be carried out by the procedure of Patent 1,971,662, of Schmidt et al.

Production of the resin starting with polyvinyl acetate and employing ethylene oxide can be depicted as follows:

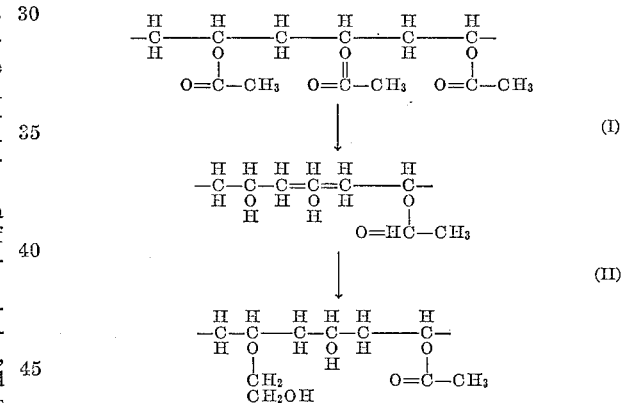

Step (I) is hydrolysis of polyvinyl acetate to polyvinyl alcohol and step (II) is the ethoxylation reaction. In the representation above, these steps are indicated merely qualitatively. The extent of the hydrolysis and ethoxylation are discussed hereinafter.

For the purposes of the invention, the polyvinyl alcohol can be the polyvinyl alcohol of commerce and derived by hydrolysis of polyvinyl acetate to the extent of about 85–100%, and the molecular weight of the polyvinyl alcohol can be about 8,000–22,000.

The polyvinyl alcohol is oxylated with epoxy compound to the extent of at least about 0.15 mole, and can be oxylated to the extent of about 0.5 mole, of the epoxy compound for 1 mole of the vinyl alcohol (M.W. 44) represented in the polyvinyl alcohol. When the epoxy compound is ethylene oxide, the ratio corresponds to 15–50 parts by weight of the oxide to 100 parts of the polyvinyl alcohol. Oxylation in excess of 0.5 mole of the monepoxy compound is generally undesirable.

Properties of the coating composition in the form of aqueous solutions, and properties of the protective films depend upon the molecular weight of the polyvinyl alcohol and the extent of oxylation. As the molecular weight of the polyvinyl alcohol increases, solubility of the resin in the aqueous coating solutions decreases and viscosity of the aqueous solutions increases. On the other hand, as the extent of oxylation increases up to 0.5 mole of monoepoxy compound per mole of vinyl alcohol represented in the polyvinyl alcohol, the solubility of the resin increases and viscosity decreases. Thus, the molecular weight and oxylation can be paired to provide suitable formulations.

An important consideration is that flexibility of the protective film increases with increasing molecular weight of the polyvinyl alcohol, and since flexibility of the film is desired, the formulations should be made with this in mind.

The aforementioned ranges for molecular weight, and extent of oxylation take into account these variations in solubility, viscosity and flexibility. Thus, for example, where a high molecular weight polyvinyl alcohol is used, and this condition tends to cause limited solubility, the solubility can be increased by resorting to a high percentage oxylation.

Preferably, the molecular weight of the polyvinyl alcohol is about 8,000–12,000 and the extent of oxylation about 0.3–0.35 mole of the epoxy compound to 1 mole of the vinyl alcohol represented in the polyvinyl alcohol. When ethylene oxide is used this ratio corresponds to 30–35 parts by weight of the oxide to 100 parts by weight of the polyvinyl alcohol. Conditions found to be particularly well suited, are a molecular weight for the polyvinyl alcohol of about 10,000 and oxylation to the extent of 0.3 mole of epoxy compound to 1 mole of the vinyl alcohol represented in the polyvinyl alcohol.

Proper selection of the variables discussed above is important. Thus, working with polyvinyl alcohol having a molecular weight of about 8,000–12,000, and ethylene oxide, it has been found that ethoxylation of the polyvinyl alcohol to an extent less than 0.15 mole per mole of vinyl alcohol is unsatisfactory as the protective coverings of ethoxylation at this level do not have sufficient flexibility at commonly prevailing humidity conditions. Coverings made using these resins crack readily at relative humidities below 20%. On the other hand, resins made from the same molecular weight polyvinyl alcohol and wherein ethoxylation of the alcohol is to the extent of 0.3–0.35 mole per mole of vinyl alcohol, have good flexibility down to 15% and in some cases as low as 10% relative humidity. This is as low a humidity as is encountered in environments to which the tires are likely to be exposed. As to high humidities, these latter resins, at relative humidities of 90%, provided coverings that are very tough, showed no signs of tackiness, and give excellent protection.

Coating compositions according to the invention can be made by dissolving the condensation product or oxylation resin in hot water. The proportion of resin can be about 100 parts per 500–600 parts of water, preferably 550–600 parts water. The water can be at about 160–200° F., and the dissolving takes about 1 hour with good agitation. Following solution of the resin, it can be pumped through a fine filter and then placed in shipping containers. Suitable viscosities for the aqueous solution are 25–35 seconds by No. 4 Ford cup.

Various materials can be combined with the resin to modify the properties of the composition. Thus, plasticizers can be added to increase flexibility, and improve low temperature and low humidity properties. The plasticizers are preferably water-soluble materials suitable for plasticizing alkoxylated polyvinyl alcohol. Glycols are well suited. Hexylene glycol, glycerol and polyglycerols have been used successfully. The amount of plasticizer can be in the range of from a small but effective amount, for example 2%, up to 15% by weight or even more.

Other additives for the oxylated resin are pigments for coloring, preferably water soluble pigments; extenders such as sugar or corn syrup to lower cost; wetting agents; anti-foams; stabilizers; bacteriacides; and fungicides.

The protective covering according to the invention can be applied to tires by spraying, brushing, or rolling. The preferred manner of application is spraying. Standard spray equipment can be used. One pass with a standard type gun is sufficient to provide a suitable film which provides good protection against dirt, abrasion, and ozone. Desirably a heated spray, which heats the solution to about 160° F. is employed. An airless spray can also be used.

Following spraying, the film can be dried by using a hot air stream at 150° F. Drying time for these conditions is about 2 minutes, and effects evaporation of the water to deposit the oxylated resin, with or without plasticizer and/or other additives, as the protective film. The film is removable by washing with water.

The invention is further described with reference to the accompanying drawing wherein:

FIG. 1 is an elevation view of a tire having white sidewalls provided with a protective covering according to the invention and showing the tire with a portion of the protective covering removed; and FIG. 2 is a cross-sectional view taken on line 2—2 in FIG. 1.

The invention provides as a novel article of manufacture, a tire having surface thereof protected by a covering according to the invention. The tire 6 is formed of rubber, synthetic rubber or other rubber-like material and comprises the beads 7, which include metal rings 7a, tread 8, cord-reinforced liner portion 9, and sidewalls 10 of the usual composition. The sidewalls are light-colored, usually, and in the case of the tire shown on the drawing, white. A blue colored thin protective covering 11 is provided for the light colored sidewalls. The protective covering is shown disproportionately large in FIG. 2 in order to better illustrate the structure. The composition of this covering is an internally plasticized or oxylated polyvinyl alcohol resin, with or without plasticizer and/or other additives as described hereinbefore. The cover is removable by washing with water with a brush.

The protective covering does not interfere with identification as the size marking is impressed on the covering as is indicated at 12.

The invention is further described in the following examples. In the examples the polyvinyl alcohol is derived from polyvinyl acetate hydrolysed 88% unless otherwise indicated.

Example 1

As the resin for the coating composition, there is used the condensation product of ethylene oxide and polyvinyl alcohol in the mole proportion of 0.30 mole of ethylene oxide per mole of vinyl alcohol represented in the polyvinyl alcohol and the resin has a molecular weight of 10,000.

An aqueous solution of the condensation product is then made by adding 100 parts by weight of the condensation product to 567.5 parts by weight of water at 180° F. and contained in a steam jacketed agitator-equipped vessel. The resulting admixture is agitated vigorously for about 1 hour to dissolve the condensation product in the water. The resulting solution is pumped through a fine strainer. The filtrate is suitable for use immediately or for storage in containers.

The aqueous solution is sprayed onto the white areas of a white sidewall rubber tire using a heated spray unit which preheats the aqueous solution to 160° F. Following spraying, the aqueous film is dried by exposing it to a stream of air heated to 150° F., whereupon water evaporates and the resin is deposited on the tire sidewall as a protective covering 0.5 mil in thickness. The protective covering is removable by washing.

Example 2

The procedure of Example 1 is followed except the resin is formed from polyvinyl alcohol of molecular weight 20,000 and ethoxylation to the extent of 0.5 mole of ethylene oxide per mole of vinyl alcohol represented in the polyvinyl alcohol.

*Example 3*

The procedure described in Example 1 is followed except the aqueous coating composition is of the following formulation:

| | Parts by wt. |
|---|---|
| Polyvinyl alcohol-ethylene oxide resin | 100 |
| Hexylene glycol as plasticizer | 5 |
| Nopco JMY[1] as antifoam | 1 |
| Triton X100[1] as wetting agent | 0.5 |
| Phthalocyanine Blue | 0.5 |
| Dowicide A[1] as fungicide | 0.1 |
| Water | 568.0 |
| | 675.1 |

[1] Proprietary products available on the market at the time of the filing of this application.

The plasticizer, anti-foam, wetting agent, dye and fungicide are included in the composition by dissolving them therein following solution of the resin. The resin is formed from polyvinyl alcohol of molecular weight 10,000 and by ethoxylation to the extent of 0.32 mole of ethylene oxide per mole of vinyl alcohol represented in the polyvinyl alcohol.

Physical properties of the protective covering of this example are 2000 p.s.i. tensile strength and 100% elongation at 70° F. and 20% relative humidity.

*Example 4*

The procedure described in Example 3 is followed except the aqueous coating composition is of the following formulation:

| | Parts by wt. |
|---|---|
| Polyvinyl alcohol-ethylene oxide resin | 100 |
| Glycerol as plasticizer | 5 |
| Corn syrup as extender | 10 |
| Dowicide A as fungicide | 0.2 |
| Water | 590 |
| | 705.2 |

The resin is formed from polyvinyl alcohol of molecular weight 20,000 and .26 mole of ethylene oxide per mole of vinyl alcohol represented in the polyvinyl alcohol, and the polyvinyl alcohol is obtained by hydrolysis of polyvinyl acetate to the extent of 98%.

The protective covering of the invention can be applied using automatic spray equipment and a drying conveyor. The covering has good aging properties and has been found to withstand a temperature of 150° F. for many weeks. It is inert to rubber and rubber-like materials, and protects the tire from the usual abuses. Thus, it permits stacking the tires by weaving, as is done to pack tires for shipment without marring of the sidewalls. The covering can be left in place until after installation.

While the invention has been described in detail with reference to particular embodiments thereof, various alterations and modifications can be made and it is desired to secure all such alterations and modifications as are within the scope of the appended claims.

Having now described the invention, what is claimed is:

1. The method of providing a tire formed of rubber-like material with a protective covering removable by washing with water which comprises applying to surface of the tire a film comprising an aqueous solution of the condensation product of polyvinyl alcohol having a molecular weight of about 8,000–22,000 and a monoepoxy compound selected from the group consisting of lower alkylene oxides and styrene oxide, in the mole proportion of about 0.15–0.5 mole of the monoepoxy compound per mole of vinyl alcohol represented in the polyvinyl alcohol, and thereafter evaporating water from the film to deposit said condensation product on the surface whereby said protective covering is provided.

2. The method of claim 1, wherein said aqueous solution includes a water-soluble plasticizer for the condensation product, said plasticizer being deposited upon the evaporation with the condensation product to provide a plasticized resinous composition for the protective covering.

3. The method of claim 1, wherein the molecular weight of the polyvinyl alcohol is about 8,000–12,000 and said mole proportion is about 0.30–0.35.

4. The method of claim 1, wherein the monoepoxy compound is ethylene oxide.

5. The method of claim 1, wherein said mole proportion is about 0.15–0.5.

6. An article of manufacture, a tire formed of rubber-like material and having a thin, flexible, protective covering for surface of the tire, and which is removable from the surface by washing with water, said protective covering comprising the condensation product of polyvinyl alcohol having a molecular weight of about 8,000–22,000 and a monoepoxy compound selected from the group consisting of lower alkylene oxides and styrene oxide, in the mole proportion of about 0.15–0.5 mole of the monoepoxy compound per mole of vinyl alcohol represented in the polyvinyl alcohol.

7. An article of manufacture according to claim 6, said protective covering comprising said condensation product and a water-soluble plasticizer therefor, whereby the protective covering is provided as a plasticized resinous composition.

8. An article of manufacture according to claim 6, wherein the molecular weight of the polyvinyl alcohol is about 8,000–12,000 and said mole proportion is about 0.30–0.35.

9. An article of manufacture according to claim 6, wherein the monoepoxy compound is ethylene oxide.

10. An article of manufacture, a tire formed of rubber-like material and having a light-colored sidewall provided with a thin, flexible, protective covering removable from the sidewall by washing with water, said protective covering comprising the condensation product of polyvinyl alcohol having a molecular weight of about 8,000–22,000 and a monoepoxy compound selected from the group consisting of lower alkylene oxides and styrene oxide, in the mole proportion of about 0.15–0.5 mole of the monoepoxy compound per mole of vinyl alcohol represented in the polyvinyl alcohol.

11. An article of manufacture according to claim 10, said protective covering comprising said condensation product and a water-soluble plasticizer therefor, whereby the protective covering is provided as a plasticized resinous composition.

12. An article of manufacture according to claim 10, wherein the molecular weight of the polyvinyl alcohol is about 8,000-12,000 and said mole proportion is about 0.30–0.35.

13. An article of manufacture according to claim 10, wherein the monoepoxy compound is ethylene oxide.

References Cited in the file of this patent

UNITED STATES PATENTS

| 1,971,662 | Schmidt et al. | Aug. 28, 1934 |
| 2,372,982 | Richards et al. | Apr. 3, 1945 |
| 2,391,986 | Leach | Jan. 1, 1946 |
| 2,622,044 | Martens | Dec. 16, 1952 |

FOREIGN PATENTS

| 364,323 | Great Britain | Jan. 7, 1932 |